(12) United States Patent
Gluckman et al.

(10) Patent No.: US 10,171,777 B2
(45) Date of Patent: Jan. 1, 2019

(54) STREAMING AND STORING VIDEO CONTENT CAPTURED BY AN AUDIO/VIDEO RECORDING AND COMMUNICATION DEVICE

(71) Applicant: Ring Inc., Santa Monica, CA (US)

(72) Inventors: Jason Gluckman, San Diego, CA (US); Trevor Phillips, Los Angeles, CA (US); Joshua Roth, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 15/395,467

(22) Filed: Dec. 30, 2016

(65) Prior Publication Data

US 2017/0195639 A1    Jul. 6, 2017

Related U.S. Application Data

(60) Provisional application No. 62/273,933, filed on Dec. 31, 2015, provisional application No. 62/289,857, filed on Feb. 1, 2016.

(51) Int. Cl.
*G08B 13/196* (2006.01)
*H04N 7/18* (2006.01)
(Continued)

(52) U.S. Cl.
CPC ....... *H04N 7/186* (2013.01); *G08B 13/19656* (2013.01); *G08B 13/19665* (2013.01);
(Continued)

(58) Field of Classification Search
CPC ........ G08B 13/19656; G08B 13/19665; G08B 25/08; H04L 1/08; H04L 1/1628;
(Continued)

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2002 |
| CN | 2792061 | 11/2004 |

(Continued)

OTHER PUBLICATIONS

International Application No. PCT/US16/69435; International Filing Date Dec. 30, 2016. Notification of Transmittal of the International Search Report and the Written Opinion of the International Searching Authority, of the Declaration (12 pages).

*Primary Examiner* — Nhon T Diep
(74) *Attorney, Agent, or Firm* — Chong IP Law, LLP

(57) ABSTRACT

The present embodiments solve the problem of low-quality stored footage from video stream by storing copies of data packets at a local storage device of the A/V recording and communication device. The locally stored data is subsequently (e.g., after the live stream has terminated) uploaded to a remote storage device. If any data packets are lost during the upload process, those lost data packets can be re-sent from the local storage device to the remote storage device so that the complete recording can be stored at the remote storage device. The subsequent upload process may, in some embodiments, comprise a reliable data transfer protocol.

14 Claims, 19 Drawing Sheets

(51) Int. Cl.
*H04L 1/08* (2006.01)
*H04L 29/06* (2006.01)
*H04N 5/91* (2006.01)
*H04N 21/24* (2011.01)
*H04N 21/2743* (2011.01)
*H04N 5/77* (2006.01)
*G08B 25/08* (2006.01)
*H04L 1/16* (2006.01)
*H04L 1/18* (2006.01)

(52) U.S. Cl.
CPC ............ *G08B 25/08* (2013.01); *H04L 1/08* (2013.01); *H04L 1/1628* (2013.01); *H04L 1/1809* (2013.01); *H04L 1/1874* (2013.01); *H04L 65/4069* (2013.01); *H04N 5/77* (2013.01); *H04N 5/91* (2013.01); *H04N 21/2407* (2013.01); *H04N 21/2743* (2013.01)

(58) Field of Classification Search
CPC . H04L 1/1809; H04L 1/1874; H04L 65/4069; H04N 5/77; H04N 5/91; H04N 21/2407; H04N 21/2743
See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniftin et al. | |
| 6,192,257 B1 | 2/2001 | Ray | |
| 6,269,080 B1* | 7/2001 | Kumar | H04L 1/1614 370/236 |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 7,936,753 B1* | 5/2011 | Colloff | H04L 12/1868 370/390 |
| 7,961,653 B2 | 6/2011 | Yamomoto | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi et al. | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B1 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 10,034,023 B1* | 7/2018 | Paniconi | H04N 19/65 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2007/0206497 A1 | 9/2007 | Plamondon et al. | |
| 2010/0183024 A1* | 7/2010 | Gupta | H04L 1/0072 370/463 |
| 2010/0225455 A1 | 9/2010 | Claiborne et al. | |
| 2011/0221913 A1 | 9/2011 | Nagai et al. | |
| 2012/0262581 A1 | 10/2012 | Carter | |
| 2012/0278677 A1 | 11/2012 | Kure et al. | |
| 2013/0057695 A1 | 3/2013 | Huisking | |
| 2014/0036702 A1* | 2/2014 | Van Wyk | H04B 3/46 370/252 |
| 2014/0267716 A1 | 9/2014 | Child | |
| 2015/0035987 A1 | 2/2015 | Fernandez | |
| 2015/0163463 A1 | 6/2015 | Hwang et al. | |

FOREIGN PATENT DOCUMENTS

| | | |
|---|---|---|
| EP | 0944883 B1 | 2/1997 |
| EP | 1480462 A1 | 11/2004 |
| EP | 1558013 B1 | 10/2008 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 | 4/2001 |
| JP | 2002-033839 | 1/2002 |
| JP | 2002-125059 | 4/2002 |
| JP | 2002-342863 | 11/2002 |
| JP | 2002-344640 | 11/2002 |
| JP | 2002-354137 | 12/2002 |
| JP | 2002-368890 | 12/2002 |
| JP | 2003-283696 | 10/2003 |
| JP | 2004-128835 | 4/2004 |
| JP | 2005-341040 | 12/2005 |
| JP | 2006-147650 | 6/2006 |
| JP | 2006-262342 | 9/2006 |
| JP | 2009-008925 | 1/2009 |

(56) References Cited

FOREIGN PATENT DOCUMENTS

| WO | 9839894 | | 9/1998 |
|----|---------|----|---------|
| WO | 0113638 | A1 | 2/2001 |
| WO | 0193220 | A1 | 12/2001 |
| WO | 02085019 | A1 | 10/2002 |
| WO | 03028375 | A1 | 4/2003 |
| WO | 06038760 | A1 | 4/2006 |
| WO | 06067782 | A1 | 6/2006 |
| WO | 03096696 | A2 | 9/2006 |
| WO | 2007125143 | A1 | 11/2007 |
| WO | 2015125441 | A1 | 8/2015 |

* cited by examiner

STREAMING AND STORING VIDEO CONTENT CAPTURED BY AN AUDIO/VIDEO RECORDING AND COMMUNICATION DEVICE

CROSS-REFERENCE TO RELATED APPLICATIONS

This application claims priority to provisional application Ser. No. 62/289,857, filed on Feb. 1, 2016, and provisional application Ser. No. 62/273,933, filed on Dec. 31, 2015, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that current techniques for recording audio/video (A/V) footage with A/V recording and communication devices frequently do not capture high quality A/V footage because of lost packets in the data stream. The present embodiments solve this problem by storing copies of data packets at a local storage device of the A/V recording and communication device. The locally stored data can subsequently be uploaded to a remote storage device and, if any data packets are lost during the upload process, those lost data packets can be re-sent from the local storage device to the remote storage device so that the complete recording can be stored at the remote storage device. The subsequent upload process may, in some embodiments, comprise a reliable data transfer protocol.

Another aspect of the present embodiments includes the realization that uploading all lost data packets from the local storage device to the remote storage device may drain more power than desired from the batteries in battery powered devices. As discussed further below, some embodiments of A/V recording and communication devices are powered by rechargeable batteries. In such devices, it is desirable to avoid large power draws from the batteries so as to avoid having to frequently recharge the batteries. More frequent recharging can be inconvenient and therefore have a negative impact on the user experience. Some of the present embodiments solve this problem by uploading only a portion of the lost data packets from the local storage device to the remote storage device. In particular, the portion of lost data packets uploaded may be the portion at the beginning of the event that triggered the motion detection. In some embodiments, the length of this portion may be pre-defined, such as 5 seconds, or 3 seconds, or 1 second, or any other length of time. In other embodiments, the length of this portion may vary, and may, for example, correspond to the length of time between the beginning of the event that triggered the motion detection and the beginning of the video stream to the user's client device (and/or to the backend server/storage device).

In a first aspect, a method for transmitting and storing video images captured by an audio/video (A/V) recording and communication device is provided, the A/V recording and communication device includes a camera and a local storage device, the A/V recording and communication device is connected to a network, the method comprises the A/V recording and communication device detecting a person at the A/V recording and communication device; the camera of the A/V recording and communication device capturing video images from within a field of view of the camera at the A/V recording and communication device; initiating a call to a client device via the network; transmitting the video images in a plurality of data packets to the client device via the network; receiving at least one negative-acknowledgement (NACK) indicating that at least one of the data packets was lost in transmission; retransmitting the lost data packets to the network; receiving a message with a list of data packets that were lost in retransmission; storing copies of the data packets on the list at the local storage device of the A/V recording and communication device; receiving a notification that the call with the client device has terminated; and after receiving the notification that the call with the client device has terminated, retrieving the data packets stored at the local storage device of the A/V recording and communication device and retransmitting the retrieved data packets to the network.

In an embodiment of the first aspect, the retrieved data packets are retransmitted to the network using a reliable data transfer protocol.

In an embodiment of the first aspect, the A/V recording and communication device further comprises a sensor, and wherein detecting the person at the A/V recording and communication device comprises the sensor detecting the person.

In an embodiment of the first aspect, the sensor is a motion sensor.

In an embodiment of the first aspect, the A/V recording and communication device is a doorbell having a button.

In an embodiment of the first aspect, detecting the person at the A/V recording and communication device comprises detecting that the button has been depressed.

In an embodiment of the first aspect, the A/V recording and communication device further comprises a microphone and a speaker.

In a second aspect, an audio/video (A/V) recording and communication device is provided, the A/V recording and communication device comprises a camera, a processor, a memory, and a local storage device, the A/V recording and communication device is connected to a network, wherein the memory stores code operable by the processor for detecting a person at the A/V recording and communication device; capturing video images from within a field of view of the camera at the A/V recording and communication device; initiating a call to a client device via the network; transmitting the video images in a plurality of data packets to the client device via the network; receiving at least one negative-acknowledgement (NACK) indicating that at least one of the data packets was lost in transmission; retransmitting the lost data packets to the network; receiving a message with a list of data packets that were lost in retransmission; storing copies of the data packets on the list at the local storage device of the A/V recording and communication device; receiving a notification that the call with the client device has terminated; and after receiving the notification that the call with the client device has terminated, retrieving the data packets stored at the local storage device of the A/V recording and communication device and retransmitting the retrieved data packets to the network.

In an embodiment of the second aspect, the retrieved data packets are retransmitted to the network using a reliable data transfer protocol.

In an embodiment of the second aspect, the A/V recording and communication device further comprises a sensor, and wherein detecting the person at the A/V recording and communication device comprises the sensor detecting the person.

In an embodiment of the second aspect, the sensor is a motion sensor.

In an embodiment of the second aspect, the A/V recording and communication device is a doorbell having a button.

In an embodiment of the second aspect, detecting the person at the A/V recording and communication device comprises detecting that the button has been depressed.

In an embodiment of the second aspect, the A/V recording and communication device further comprises a microphone and a speaker.

BRIEF DESCRIPTION OF THE DRAWINGS

The present embodiments now will be discussed in detail with an emphasis on highlighting the advantageous features. These embodiments depict the novel and non-obvious apparatus, systems, and methods for streaming and storing audio and video content captured by an A/V recording and communication device as shown in the accompanying drawings, which are for illustrative purposes only. These drawings include the following figures, in which like numerals indicate like parts.

DETAILED DESCRIPTION

Figure 1:
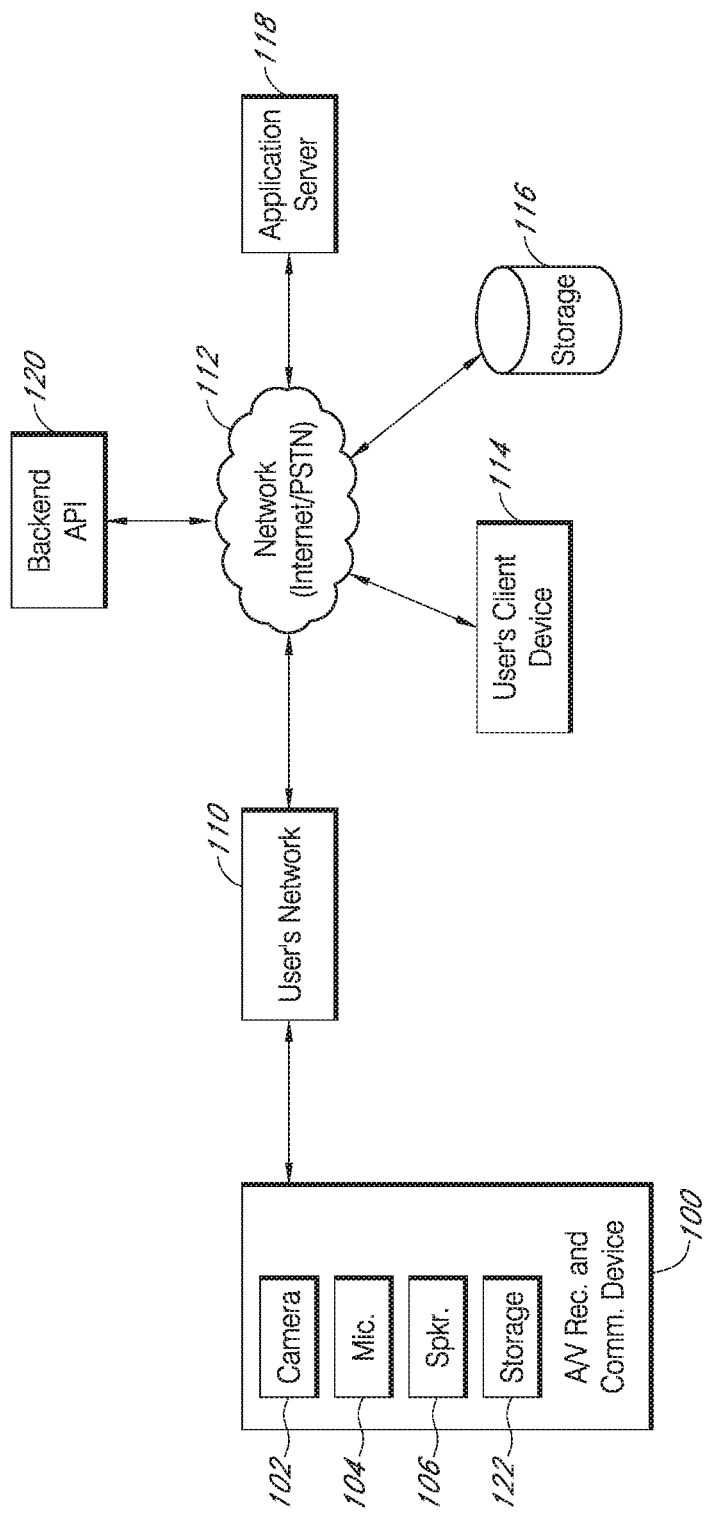
FIG. 1 is a functional block diagram illustrating a system for streaming and storing video content captured by an A/V recording and communication device according to the present embodiments.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments include an audio/video (A/V) communication device, such as a doorbell. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more application servers 118, and/or a backend API (application programming interface) 120 via the user's network 110 and the network 112 (Internet/PSTN). While FIG. 1 illustrates the storage device 116, the application server 118, and the backend API 120 as components separate from the network 112, it is to be understood that the storage device 116, the application server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed. Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, UPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence using a motion sensor, and/or by detecting that the visitor has depressed the button on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may he construed broadly to include any computerized process that shares a resource to one or more client processes. In another example, the network device to which the request is sent may be an API such as the backend API 120, which is described below.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

In A/V recording and communication device systems other than the present embodiments, the quality of the video and/or audio recorded on the remote storage device may be negatively impacted by lost packets. For example, during the transmission of the streaming video and/or audio from the A/V recording and communication device to the user's client device, packets may get lost. The system may attempt to recover lost packets. For example, the network may send a NACK (Negative-Acknowledgement) to the A/V recording and communication device. The NACK indicates that a data packet sent from the A/V recording and communication device was not received. If the A/V recording and communication device still has a copy of the lost data packet available, the A/V recording and communication device can resend the lost data packet. But, sometimes the A/V recording and communication device no longer has a copy of the lost data packet available. The A/V recording and communication device might no longer have a copy of the lost data packet available because data packets are typically stored in buffers of the A/V recording and communication device during the streaming process, and these data buffers are frequently overwritten as more data packets are transmitted, resulting in loss of any data packets that were stored in the overwritten buffers. At other times, the A/V recording and communication device may resend a copy of a lost data packet when a copy of the lost data packet is still in one of the buffers, but sometimes the re-sent data packet also gets lost. At still other times, a packet may be re-sent, but a time interval that the application server has allotted to receive and handle packets has expired, so the re-sent packet is discarded. When lost packets cannot be recovered, the video and/or audio recorded on the remote storage device contains gaps, which degrade the quality of the video and/or audio. The present embodiments solve this problem by storing copies of lost packets at local storage of the A/V recording and communication device, and then uploading the lost packets to the remote storage device after the call between the A/V recording and communication device and the user's client device has terminated.

With further reference to FIG. 1, the present A/V recording and device 100 further includes a storage device 122 (may be referred to interchangeably as "local storage 122"). The storage device 122 may comprise, for example, a flash memory device, a hard disk device, an optical disk device, or any other type of storage device. In some embodiments, the storage device 122 may comprise volatile storage, such as RAM. When the A/V recording and communication device 100 according to the present embodiments captures video images, those video images are transmitted to the user's client device 114 as packetized data, and data packets that get lost in transmission are stored, at least temporarily, at the A/V recording and communication device local storage 122. The locally stored copies of the lost packets are later uploaded to the remote storage device 116, after the call between the A/V recording and device 100 and the user's client device 114 has terminated. The upload of the lost packets may use a lossless data transfer protocol, so that all of the lost packets reach the remote storage device 116. The lost packets are then combined, or reassembled, with the remaining packets in the video stream at the remote storage device 116. The sequence numbers of the packets facilitate reassembly of the packets in the proper order.

Figure 2:
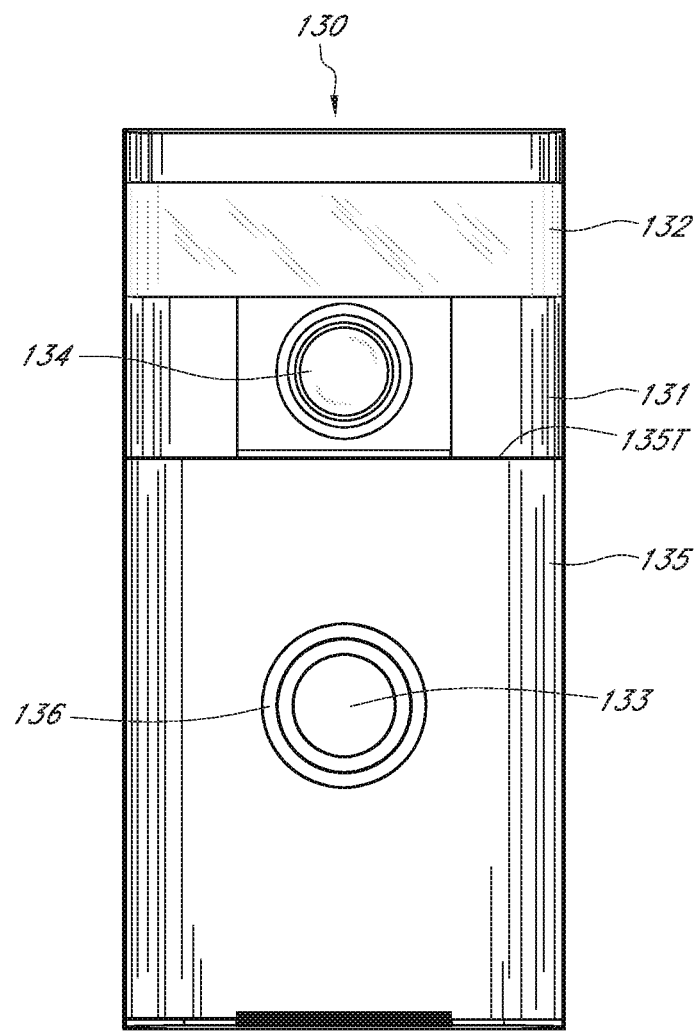
FIG. 2 is a front view of an A/V recording and communication doorbell according to an aspect of the present disclosure.
Figure 3:
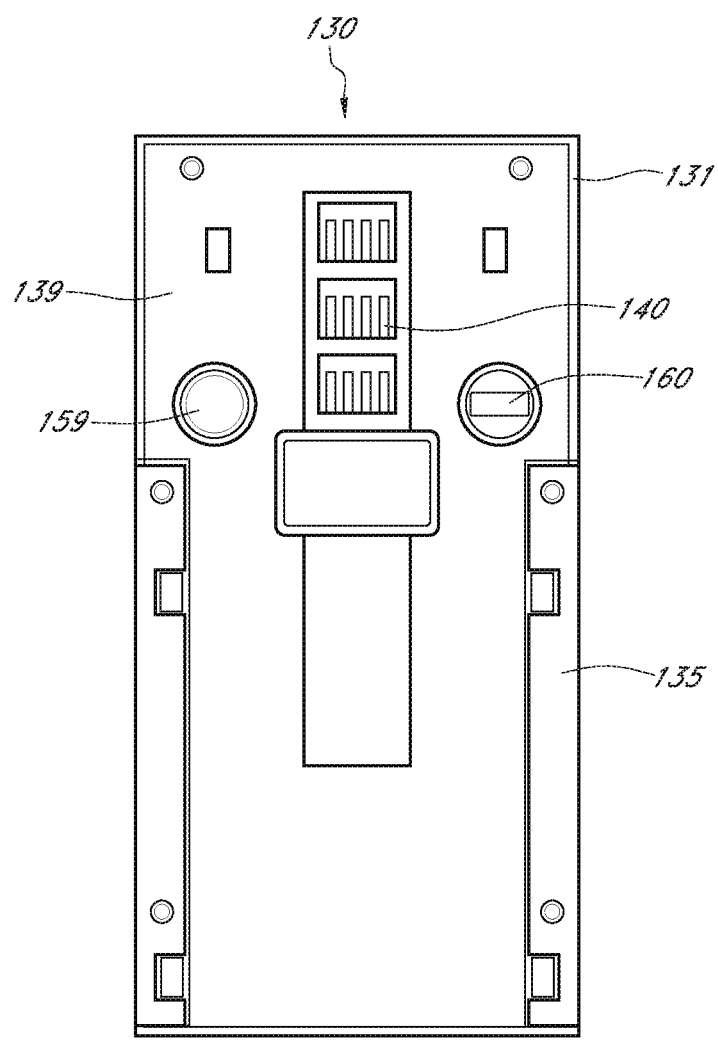
FIG. 3 is a rear view of the A/V recording and communication doorbell of FIG. 2.
Figure 4:
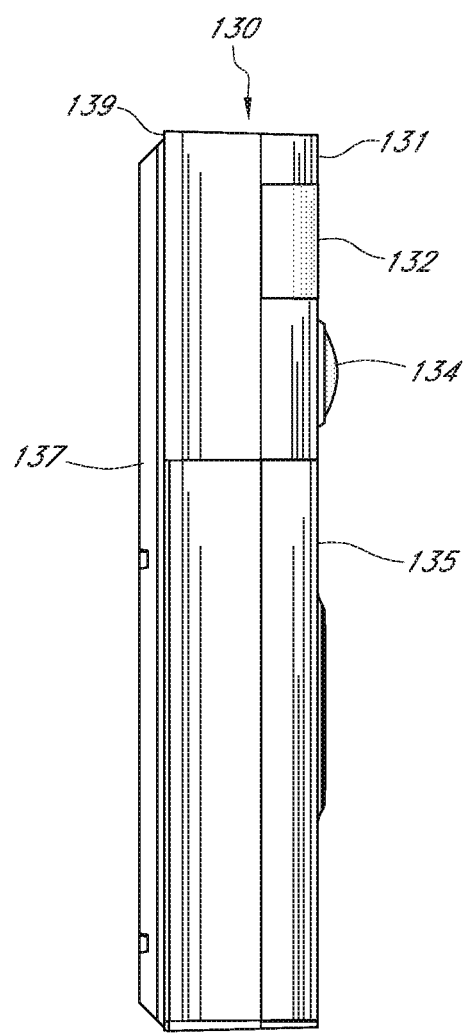
FIG. 4 is a left side view of the A/V recording and communication doorbell of FIG. 2 attached to a mounting bracket according to an aspect of the present disclosure.

FIGS. 2-4 illustrate an audio/video (A/V) recording and communication device 130 according to an aspect of present embodiments. While the device 130 illustrated in FIGS. 2-4 is a doorbell, the present embodiments are equally applicable to other types of A/V recording and communication devices, such as security cameras. FIG. 2 is a front view, FIG. 3 is a rear view, and FIG. 4 is a left side view of the doorbell 130 coupled with a mounting bracket 137. The doorbell 130 includes a faceplate 135 mounted to a back plate 139 (FIG. 3). With reference to FIG. 4, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 2, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 2 and 4, the doorbell 130 further includes an enclosure 131 that engages the faceplate 135. In the illustrated embodiment, the enclosure 131 abuts an upper edge 135T (FIG. 2) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 3 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 3, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 4 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 4, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 5:
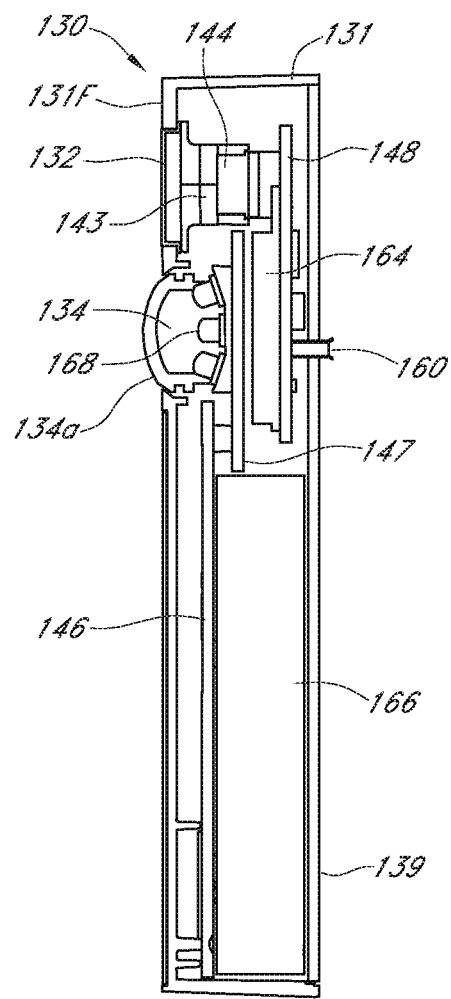
FIG. 5 is cross-sectional right side view of the A/V recording and communication doorbell of FIG. 2.

FIG. 5 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell 130 with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 5, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 5, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 5, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 6:
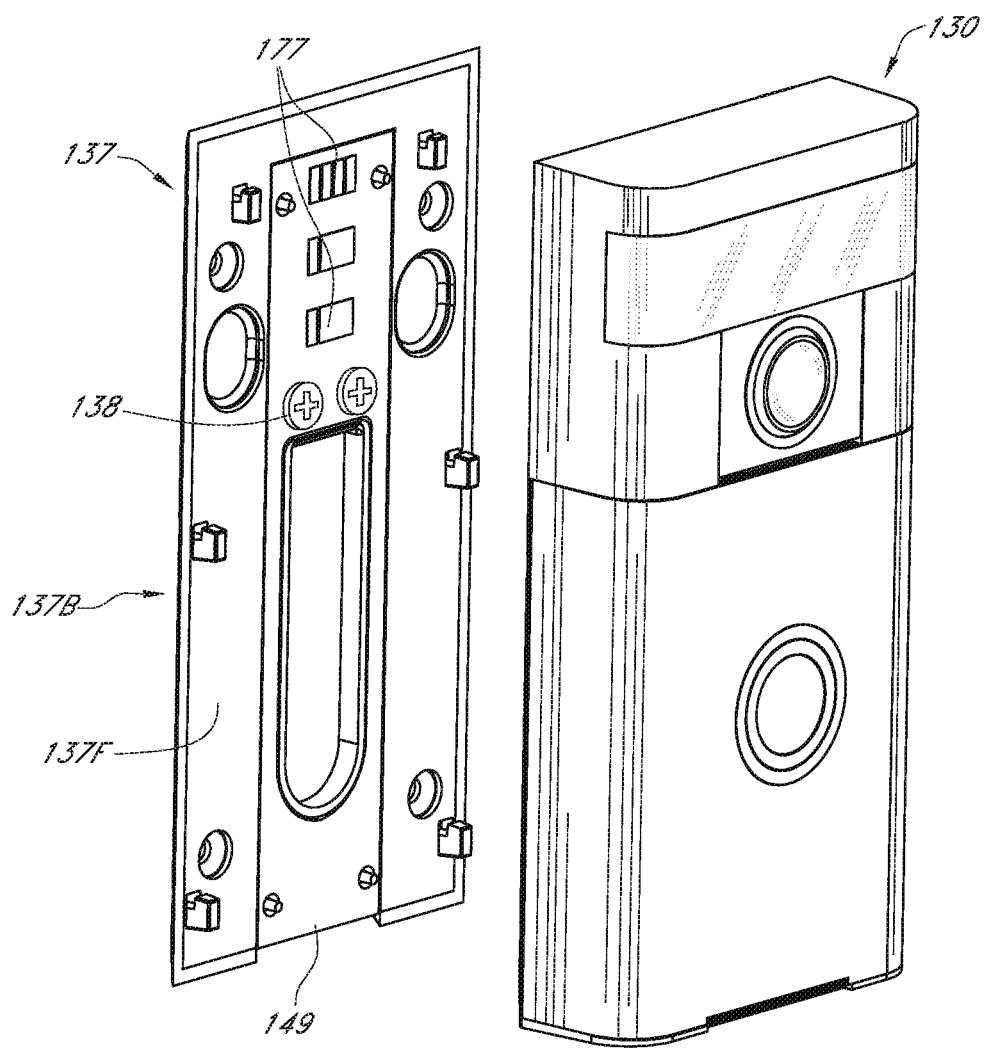
FIG. 6 is an exploded view of the A/V recording and communication doorbell and the mounting bracket of FIG. 4.

FIG. 6 is an exploded view of the doorbell 130 and the mounting bracket 137 according to an aspect of the present embodiments. The mounting bracket 137 is configured to be mounted to a mounting surface (not shown) of a structure, such as a home or an office. FIG. 6 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 6, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 7:
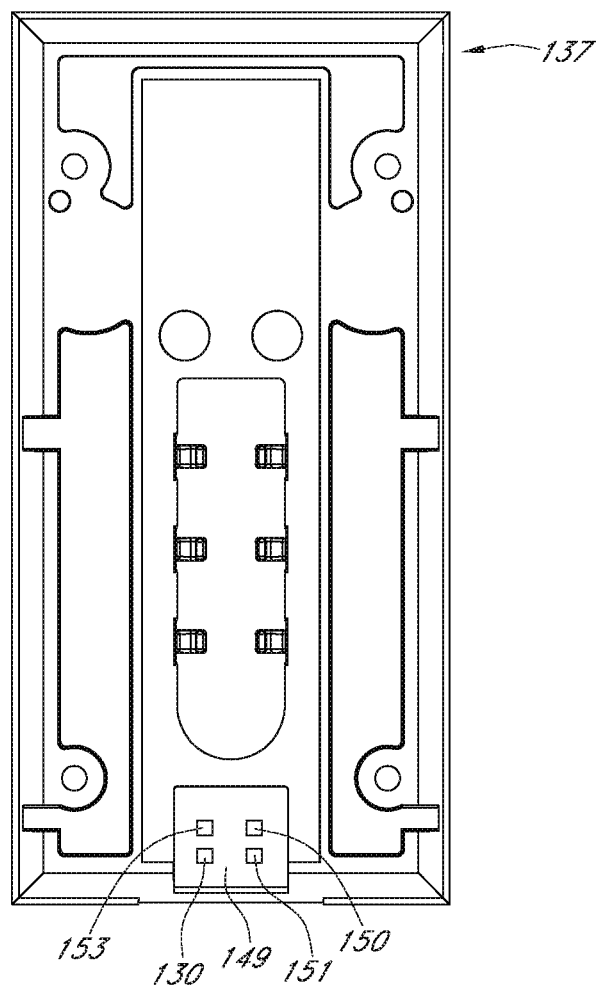
FIG. 7 is a rear view of the mounting bracket of FIG. 4.

With reference to FIGS. 6 and 7 (which is a rear view of the mounting bracket 137), the mounting bracket 137 further comprises a bracket PCB 149. With reference to FIG. 7, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 8A:
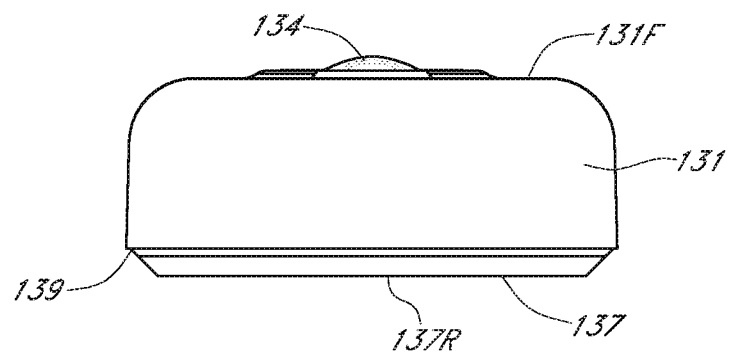
FIGS. 8A and 8B are top and bottom views, respectively, of the A/V recording and communication doorbell and the mounting bracket of FIG. 4.
Figure 8B:
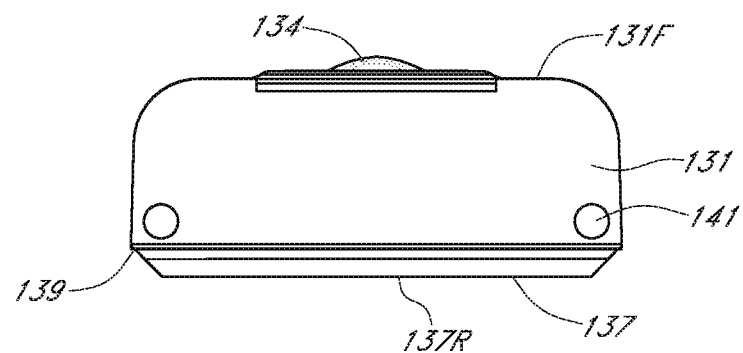

FIGS. 8A and 8B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 8B, the lower end of the enclosure 131 may include security screw apertures 141 configured to receive screws or other fasteners.

Figure 9A:
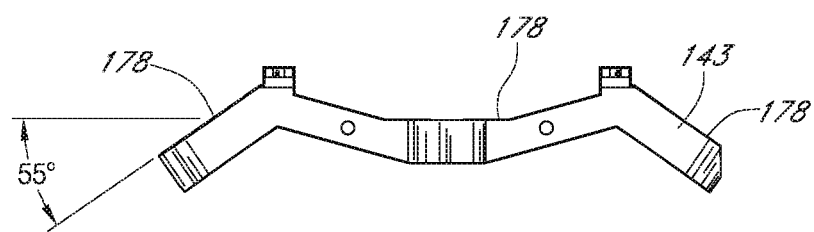
FIGS. 9A and 9B are top and front views, respectively, of a passive infrared sensor holder of the A/V recording and communication doorbell of FIG. 2.

FIG. 9A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 9A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 9B:
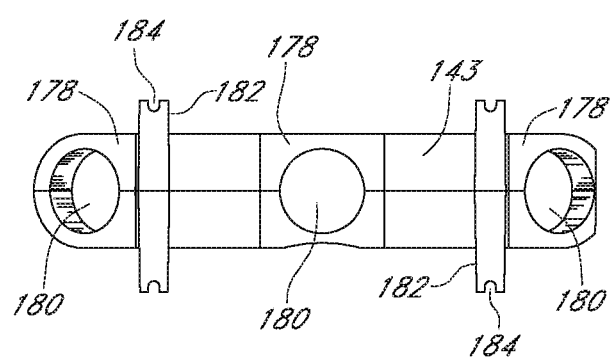

FIG. 9B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 10A:
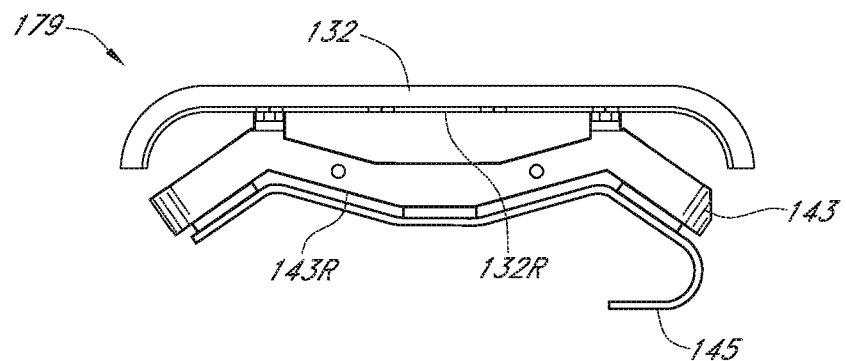
FIGS. 10A and 10B are top and front views, respectively, of a passive infrared sensor holder assembly of the A/V recording and communication doorbell of FIG. 2.
Figure 10B:
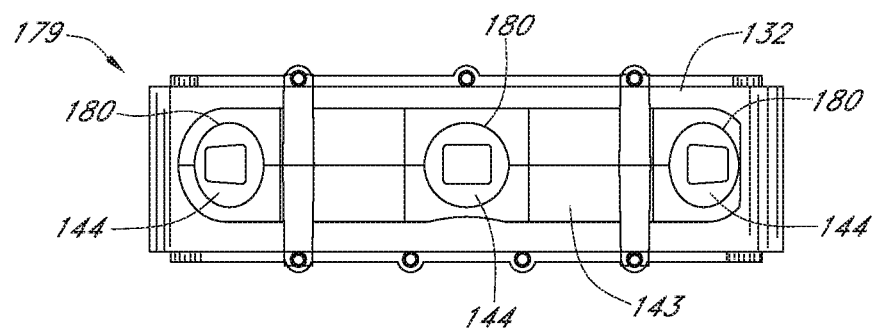

FIGS. 10A and 10B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 5).

Figure 11:
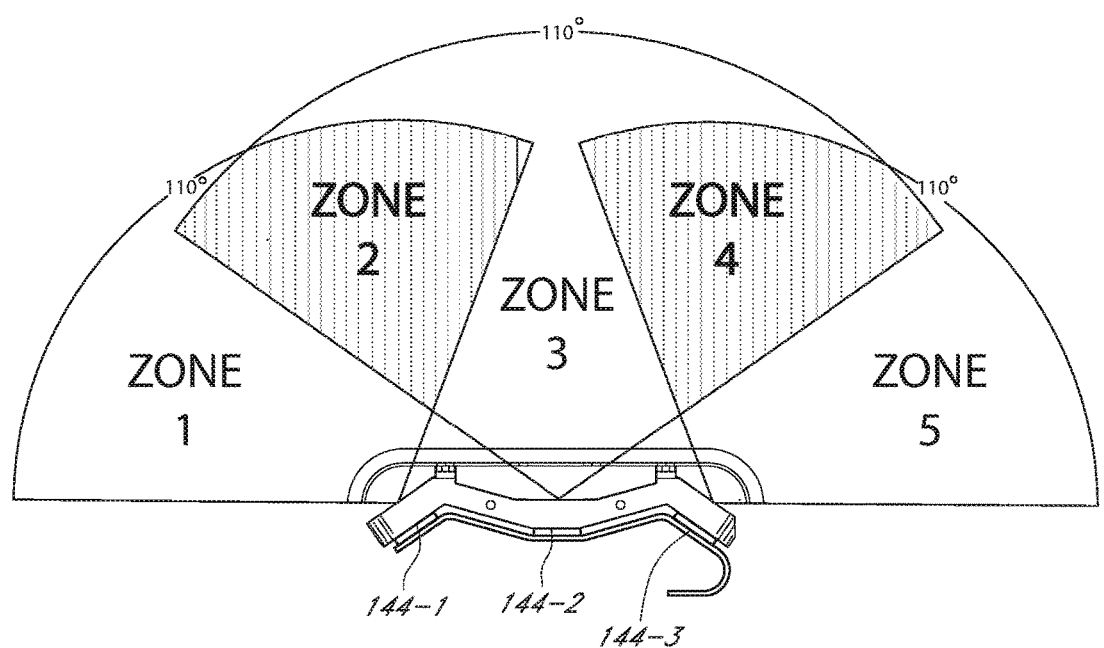
FIG. 11 is a top view of the passive infrared sensor assembly of FIG. 10A and a field of view thereof according to an aspect of the present disclosure.

FIG. 11 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 12:
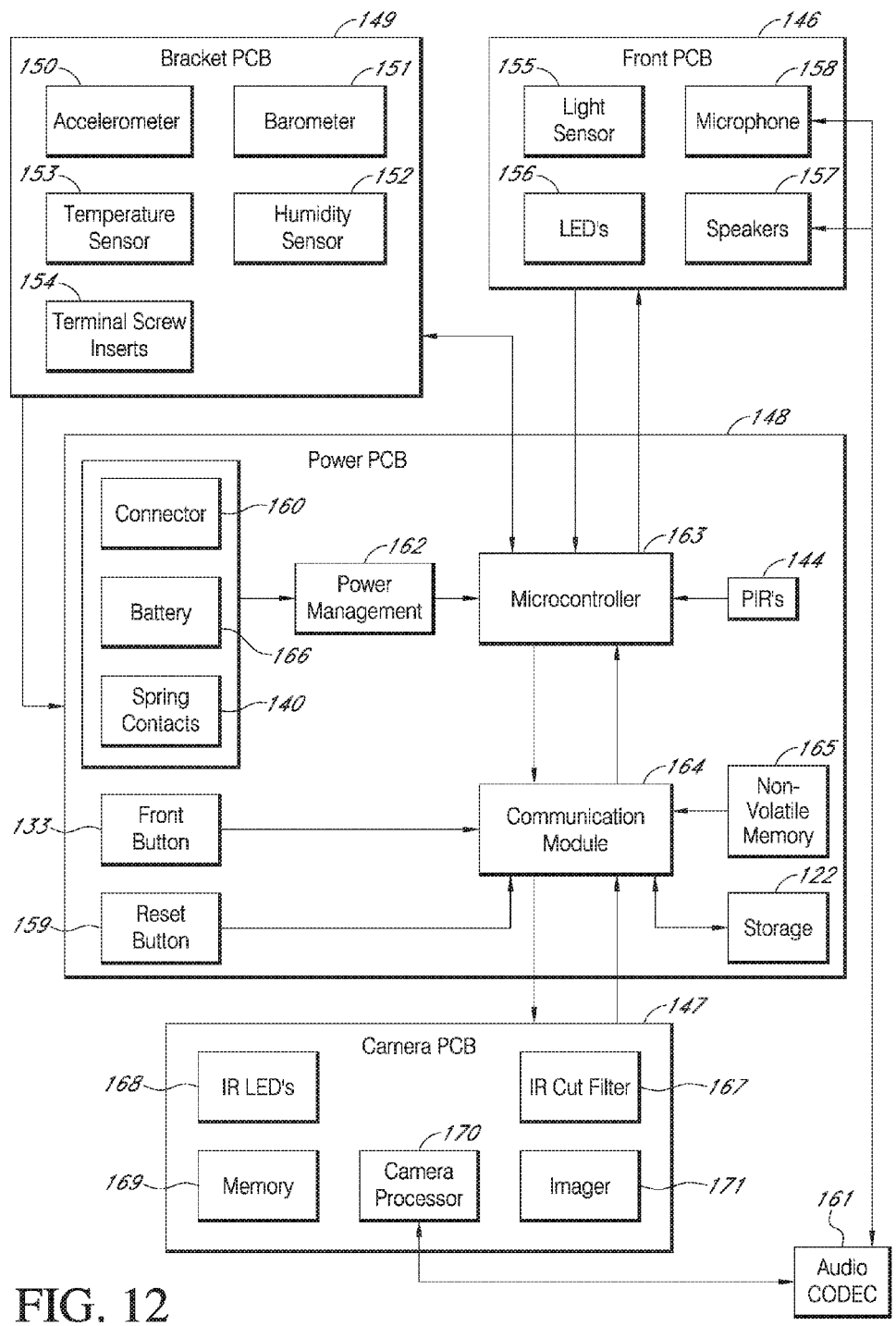
FIG. 12 a functional block diagram of the components of the A/V recording and communication doorbell of FIG. 2.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell 130 can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more application servers 118, and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise local storage 122, a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell 130. This process may provide the doorbell 130 with the "night vision" function mentioned above.

Figure 13:
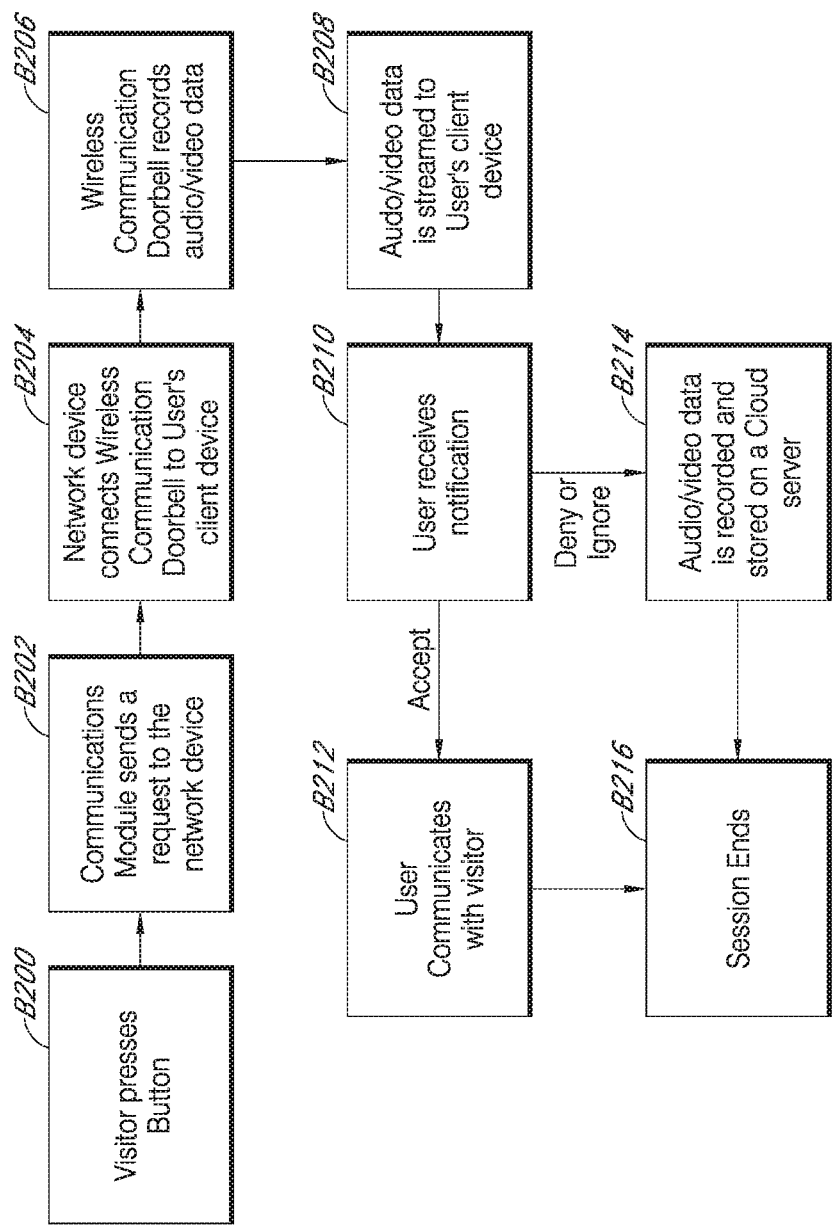
FIG. 13 is a flowchart illustrating a process for an A/V recording and communication doorbell according to an aspect of the present disclosure.

FIG. 13 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server (block B214) even if the user accepts the notification and communicates with the visitor through the user's client device 114.

Figure 14:
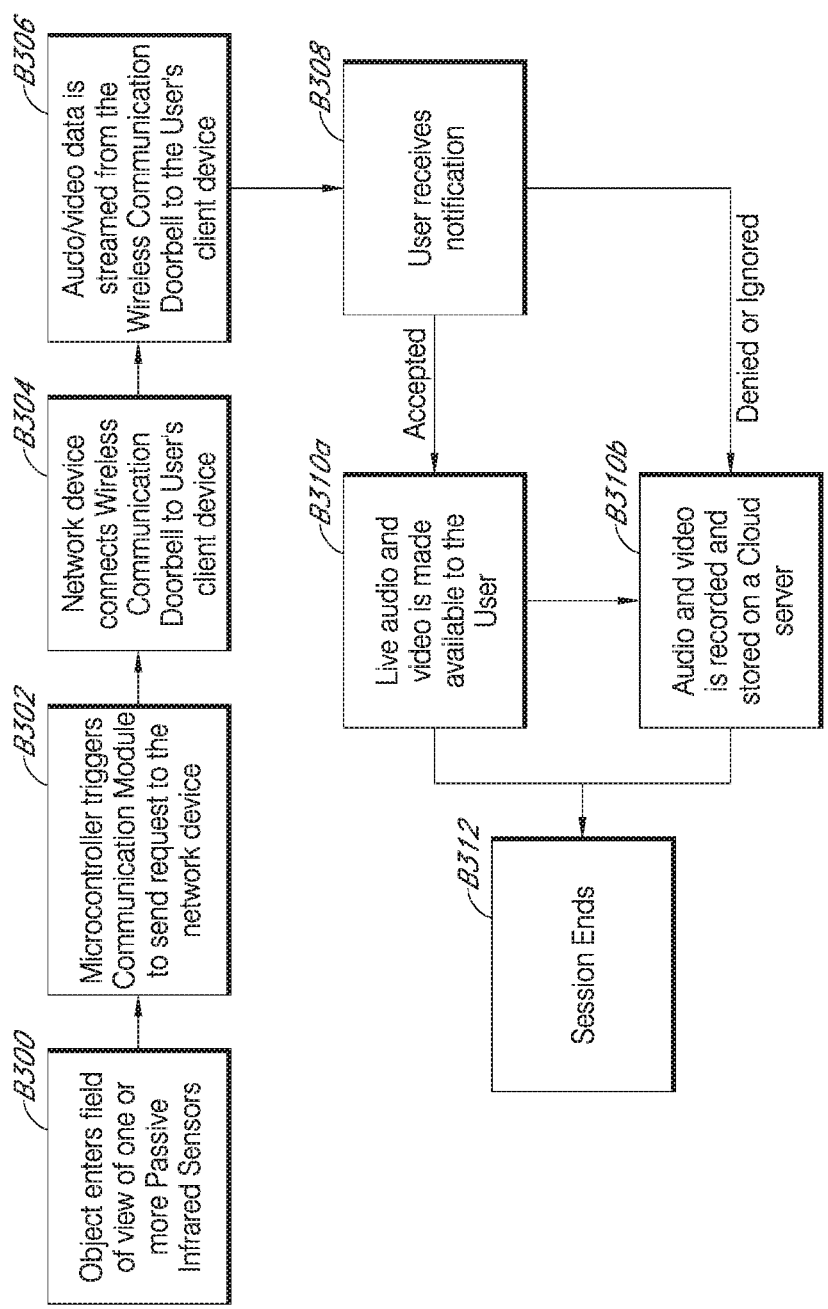
FIG. 14 is a flowchart illustrating another process for an A/V recording and communication doorbell according to an aspect of the present disclosure.

FIG. 14 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310$a$ the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310$b$, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server (block B310$b$) even if the user accepts the notification and communicates with the visitor through the user's client device 114.

Figure 15:
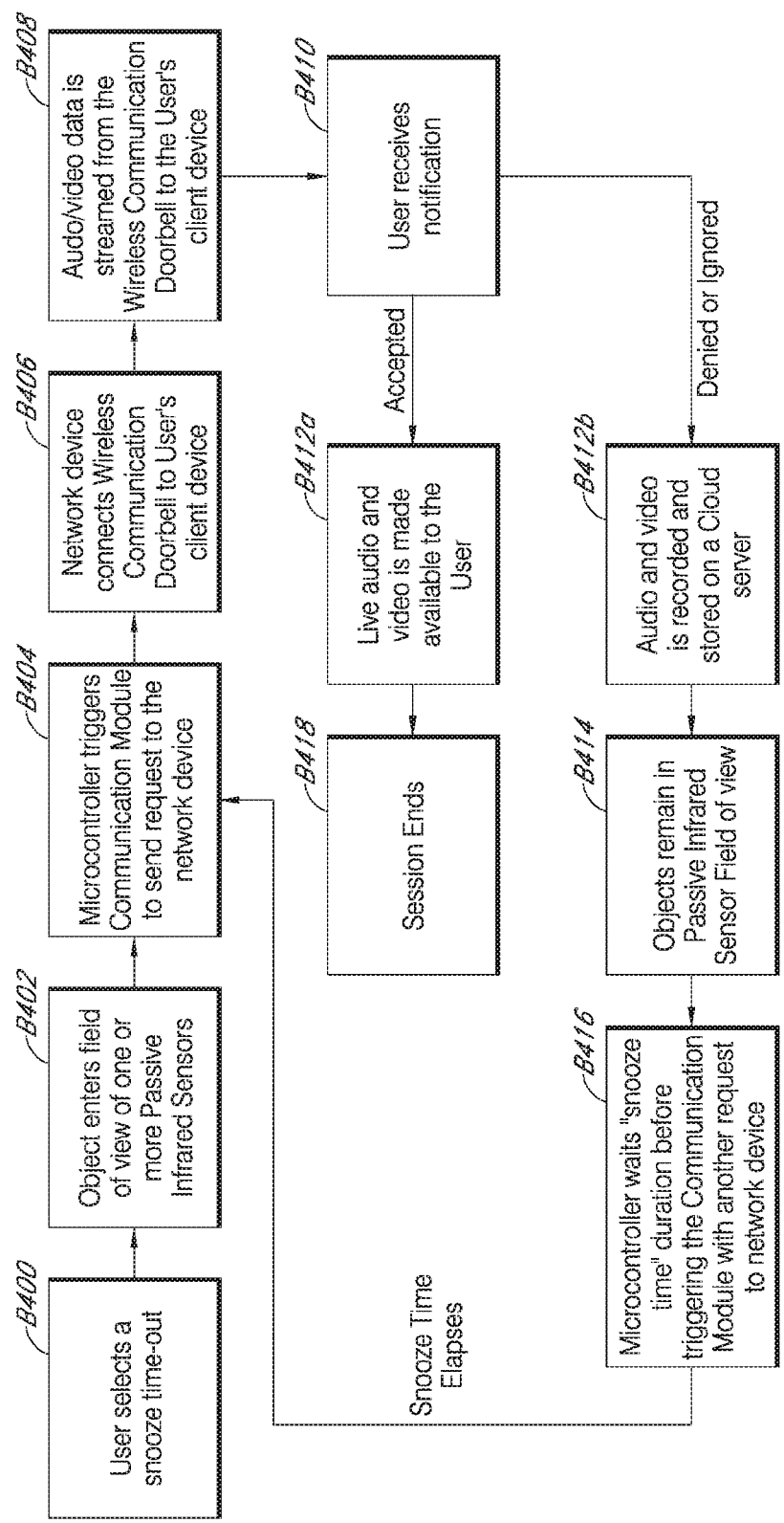
FIG. 15 is a flowchart illustrating another process for an A/V recording and communication doorbell according to an aspect of the present disclosure.

FIG. 15 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server (block B412b) even if the user accepts the notification and communicates with the visitor through the user's client device 114.

As described above, one aspect of the present embodiments includes the realization that current techniques for recording audio/video (A/V) footage with A/V recording and communication devices frequently do not capture high quality A/V footage because of lost packets in the data stream. The present embodiments solve this problem by storing copies of data packets at a local storage device of the A/V recording and communication device. The locally stored data can subsequently be uploaded to a remote storage device and, if any data packets are lost during the upload process, those lost data packets can be re-sent from the local storage device to the remote storage device so that the complete recording can be stored at the remote storage device.

Figure 16:
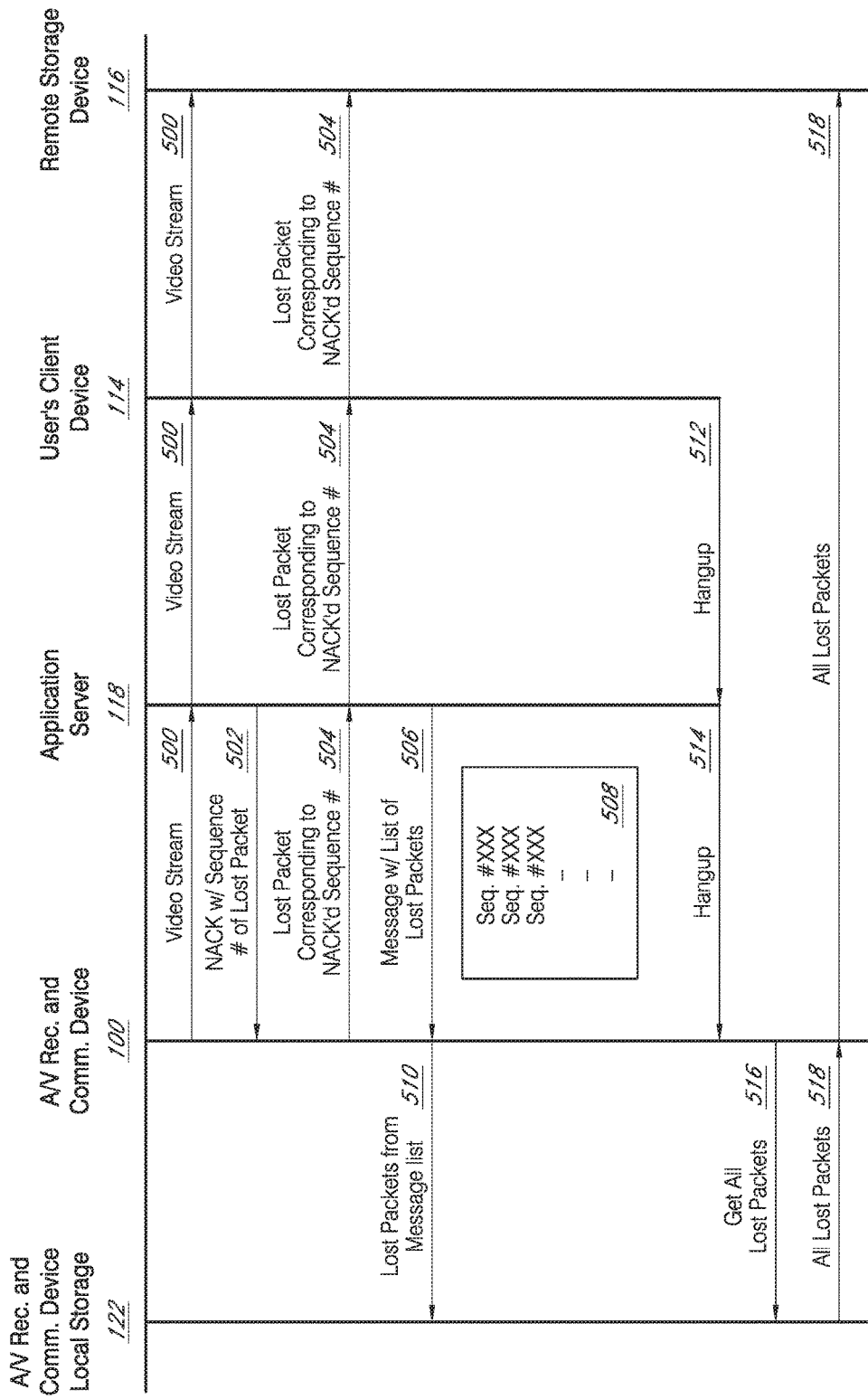
FIG. 16 is a sequence diagram illustrating a method for streaming and storing A/V content captured by an A/V recording and communication device according to the present embodiments.

FIG. 16 is a sequence diagram illustrating a method for streaming and storing A/V content captured by an A/V communication device according to the present embodiments. The sequence of FIG. 16 may be initiated when the doorbell 130 detects a person at the doorbell 130. For example, if the doorbell 130 includes a sensor, such as a motion sensor, then detecting the person at the doorbell 130 may comprise the motion sensor detecting the person. Alternatively, detecting the person at the doorbell 130 may comprise detecting that the button of the doorbell 130 has been depressed.

In response to detecting the person at the doorbell 130, the camera 134 of the doorbell 130 begins capturing video images of the area within the field of view of the camera 134. For example, the camera 134 may capture video images of the person at the doorbell 130. In some embodiments, the doorbell 130 may also capture audio through the microphone 158. The video images captured by the camera 134 are transmitted to the application server 118 in a video stream 500, which comprises a plurality of data packets. The video stream 500 is also transmitted to the user's client device 114 and the remote storage device 116. In some embodiments, the audio captured through the microphone 158 may also be transmitted to the application server 118, the user's client device 114, and/or the remote storage device 116. Also in some embodiments, the video stream 500 may be transmitted to multiple client devices 114.

In some embodiments, the video stream 500 uses an unreliable data protocol, such as User Datagram Protocol (UDP). UDP is one of the core members of the Internet protocol suite. UDP uses a simple connectionless transmission model with a minimum of protocol mechanism. UDP has no handshaking dialogues, and thus there is no guarantee of delivery, ordering, or duplicate protection. However, time-sensitive applications, such as video streaming, typically use UDP because dropping packets is preferable to waiting for delayed packets, because waiting for delayed packets is not really an option in a real-time system like video streaming.

Because the video stream 500 uses an unreliable data protocol, some packets in the video stream 500 may not be received at the application server 118. When data packets in the video stream 500 are not received at the application server 118, the application server 118 sends one or more NACKs 502 to the doorbell 130. Each NACK 502 includes a sequence number of the lost data packet corresponding to the NACK 502. The doorbell 130 then retrieves from its buffers the lost data packet corresponding to the sequence number in the NACK 502, and resends the lost data packet 504 to the application server 118. The lost data packet 504 is also transmitted to the user's client device 114 and the remote storage device 116.

Sometimes, however, the re-sent data packet also gets lost. Therefore, periodically the application server 118 sends a message 506 to the doorbell 130 with an aggregated list 508 of the lost data packets that never reached the application server 118. In one non-limiting example, the message 506 may be sent using Session Initiation Protocol (SIP). In response to the message 506, the doorbell 130 reads the aggregated list 508, retrieves from its buffers the lost data packets listed in the aggregated list 508, and writes the lost data packets 510 to the A/V recording and communication device local storage 122. The lost data packets 510 written to the A/V recording and communication device local storage 122 are later uploaded to the remote storage device 116, as described below.

The steps described above may be repeated any number of times (as represented by the break lines in FIG. 16) until the user hangs up 512 or until the application server 118 hangs up 514, which may happen, for example, if the call between the doorbell 130 and the user's client device 114 times out. After hangup 512, 514, the doorbell 130 performs a read operation 516 to retrieve the lost data packets stored at the A/V recording and communication device local storage 122. The lost data packets read out of the A/V recording and communication device local storage 122 are then transmitted (or uploaded) 518 from the doorbell 130 to the remote storage device 116.

In some embodiments, the process 518 of uploading the lost data packets from the doorbell 130 to the remote storage device 116 uses a reliable data transfer protocol, such as Transmission Control Protocol (TCP). TCP is a core protocol of the Internet protocol suite. TCP provides reliable, ordered, and error-checked delivery of a stream of octets between applications running on hosts communicating over an IP network. Because the upload process 518 uses a reliable data protocol, none of the packets are lost in the upload process 518. And, because the upload process 518 takes place after the call between the doorbell 130 and the user's client device 114 has terminated, the upload process 518 does not have the same time constraints as a streaming process, which makes the use of a reliable data transfer protocol practical. The packets uploaded in the process 518 are combined, or reassembled, with the packets that were uploaded to the remote storage device 116 in the video stream 500 and the NACK process 504 to generate a complete copy of the video images that were captured by the camera 134 of the doorbell 130. The sequence numbers of the packets facilitate reassembly of the packets in the proper order. The copy of the video images stored at the remote storage device 116 is thus of higher quality compared to other techniques for cloud video recording.

Figure 17:
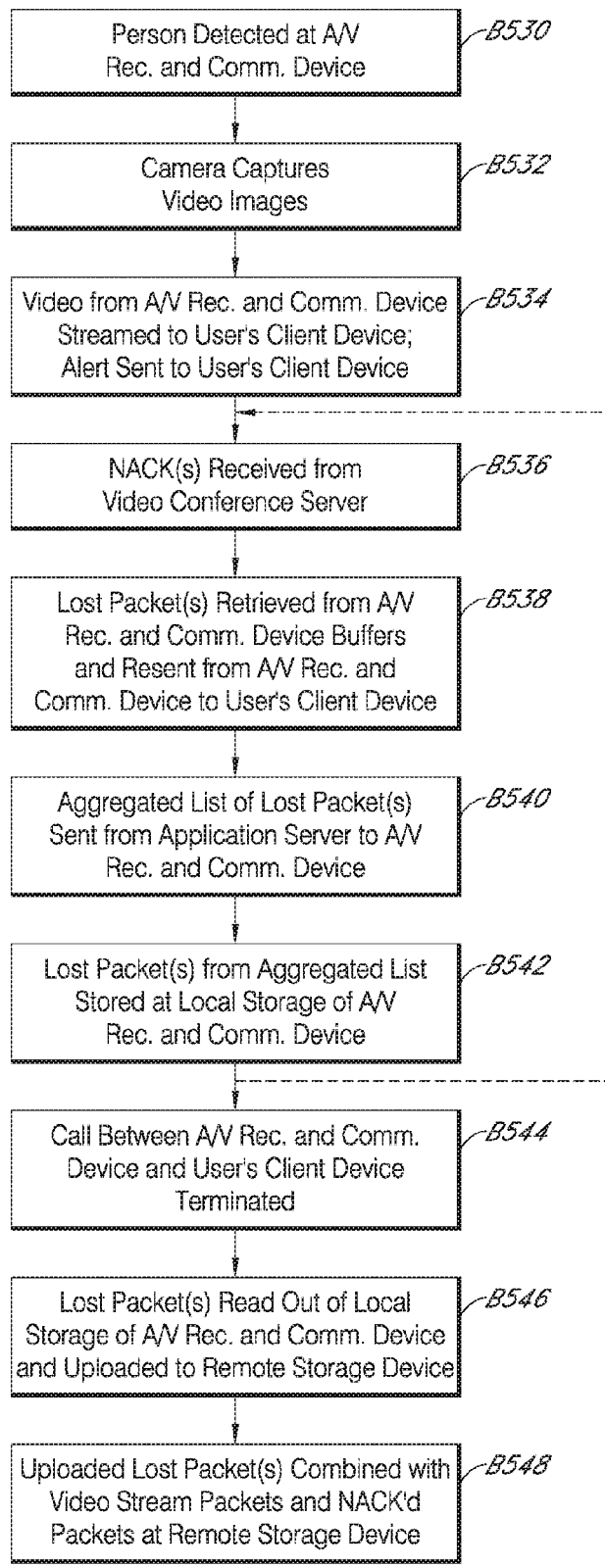
FIG. 17 is a flowchart illustrating a method for streaming and storing A/V content captured by an A/V recording and communication device according to the present embodiments.

FIG. 17 illustrates one embodiment of a method according to the present embodiments. The process begins at block B530 when the doorbell 130 detects a person at the doorbell 130. For example, if the doorbell 130 includes a sensor, such as a motion sensor, then detecting the person at the doorbell 130 may comprise the motion sensor detecting the person. Alternatively, detecting the person at the doorbell 130 may comprise detecting that the button of the doorbell 130 has been depressed.

With further reference to FIG. 17, at block B532, in response to detecting the person at the doorbell 130, the camera 134 of the doorbell 130 begins capturing video images of the area within the field of view of the camera 134. For example, the camera 134 may capture video images of the person at the doorbell 130. In some embodiments, the doorbell 130 may also capture audio through the microphone 158. At block B534, the video images captured by the camera 134 are transmitted to the user's client device 114. In some embodiments, the audio may also be transmitted to the user's client device 114. Also at block B534, an alert is transmitted to the user's client device 114. The alert may provide the user at the client device 114 with an audible tone and/or a vibration signal that alerts the user to the streaming video images on the display of the client device 114.

As described above, the video streamed to the user's client device 114 may use an unreliable data protocol, resulting in some packets being lost in transmission. Thus, at block B536, the application server 118 sends one or more NACKs to the doorbell 130. Each NACK includes a sequence number of the lost data packet corresponding to the NACK 502. Then, at block B538, the doorbell 130 retrieves from its buffers the lost data packets corresponding to the sequence numbers in the NACKs, and resends the lost data packets to the application server 118. The lost data packets are also transmitted to the user's client device 114 and the remote storage device 116.

Sometimes, however, the re-sent data packets also get lost. Therefore, at block B540, the application server 118 sends a message to the doorbell 130 with an aggregated list of the lost data packets that never reached the application server 118. In response to the message, at block B542 the doorbell 130 reads the aggregated list, retrieves from its butlers the lost data packets listed in the aggregated list, and writes the lost data packets to the A/V recording and communication device local storage 122. The lost data packets written to the A/V recording and communication device local storage 122 are later uploaded to the remote storage device 116, as described below.

Blocks B536-B542 may be repeated any number of times (as represented by the dashed arrow in FIG. 17) until the call between the doorbell 130 and the user's client device 114 is terminated, at block B544. Then, at block B546, the doorbell 130 reads the lost data packets out of the A/V recording and communication device local storage 122 and uploads the lost data packets from the doorbell 130 to the remote storage device 116. Then, at block B548, the lost packets that were uploaded at block B546 are combined, at the remote storage device 116, with the packets that were stored at the remote storage device 116 at blocks B534 and B538.

As described above, the present embodiments advantageously store copies of lost video data packets (and, in some embodiments, lost audio data packets) at a local storage device of the A/V recording and communication device. The stored copies are later uploaded to a remote storage device (in the cloud) using a reliable data transfer protocol. Thus, if any data packets are lost during the upload process, they can be re-sent from the stored copies at the local storage device of the A/V recording and communication device. The copy of the video (and/or audio) stored at the remote storage device is therefore of high quality.

As discussed above, another aspect of the present embodiments includes the realization that uploading all lost data packets from the local storage device to the remote storage device may drain more power than desired from the batteries in battery powered devices. As discussed further below, some embodiments of A/V recording and communication devices are powered by rechargeable batteries. In such devices, it is desirable to avoid large power draws from the batteries so as to avoid having to frequently recharge the batteries. More frequent recharging can be inconvenient and therefore have a negative impact on the user experience. Some of the present embodiments solve this problem by uploading only a portion of the lost data packets from the local storage device to the remote storage device. In particular, the portion of lost data packets uploaded may be the portion at the beginning of the event that triggered the motion detection. In some embodiments, the length of this portion may be pre-defined, such as 5 seconds, or 3 seconds, or 1 second, or any other length of time. In other embodiments, the length of this portion may vary, and may, for example, correspond to the length of time between the beginning of the event that triggered the motion detection and the beginning of the video stream to the user's client device (and/or to the backend server/storage: device)

In some embodiments video images recorded by the camera 134 of the doorbell 130 may be stored at the local storage 122 beginning from a time that the camera 134 begins capturing video images. As described above, in response to detecting a person at the doorbell 130, the camera 134 of the doorbell 130 begins capturing video images of the area within the field of view of the camera 134. The video images captured by the camera 134 are transmitted to the application server 118 (and/or to the user's client device 114 and/or to the remote storage device 116) in the video stream 500. There may be a delay, however, between the time the camera 134 begins capturing video images and the time the video stream 500 begins. Some of the present embodiments may store video images recorded during this delay period at the local storage 122 of the doorbell 130. The stored video images recorded during the delay period may subsequently be uploaded to the remote storage device 116 after the call between the doorbell 130 and the user's client device 114 has terminated.

In some embodiments, the video images uploaded to the remote storage device 116 after the call between the doorbell 130 and the user's client device 114 has terminated may comprise only the video images recorded during the delay period between when the camera 134 begins capturing video images and when the video stream 500 begins. The length of this delay period may vary. Thus, the amount of video image data uploaded may also vary. In some embodiments, however, the video image data uploaded after the call between the doorbell 130 and the user's client device 114 has terminated may have a fixed length, such as 5 seconds, or 3 seconds, or 1 second, or any other length of time. Thus, the video image data uploaded after the call has terminated may comprise a fixed length of time as measured from the time that the camera 134 begins capturing video images. The video image data may be uploaded to the remote storage device 116 using a reliable data transfer protocol, such as TCP.

In embodiments in which the only video images uploaded to the remote storage device 116 after the call between the doorbell 130 and the user's client device 114 has terminated, the power draw on the battery 166 of the doorbell 130 may advantageously be less than the power draw for embodiments in which all lost packets 518 from the video stream 500 are uploaded. In some cases, this advantage may result from the unpredictability of the number of data packets that may get lost in the video stream 500. When the number of lost packets is very high, the upload process after the call between the doorbell 130 and the user's client device 114 has terminated may take a long time, which may drain a significant amount of power from the battery 166.

The present embodiments have been described with reference to the doorbell 130 illustrated in FIGS. 2-12. It should be understood, however, that the present embodiments are equally applicable to any A/V recording and communication device that is capable of recording video footage and/or audio and transmitting, either wirelessly or by wired connection, or both, the recorded video footage and/or audio. In certain embodiments, for example, the A/V recording and communication device may not be a doorbell, but may be, for example, an A/V recording and communication security camera.

Figure 18:
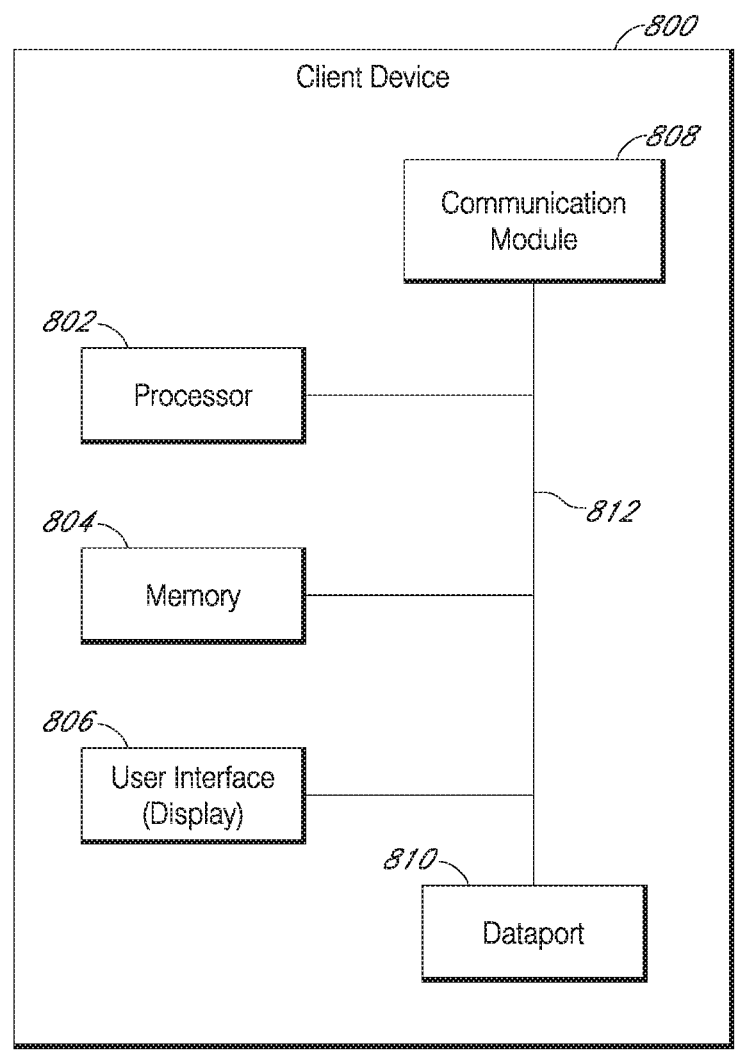
FIG. 18 is a functional block diagram of a client device on which the present embodiments may be implemented according to various aspects of the present disclosure.

FIG. 18 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 18, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
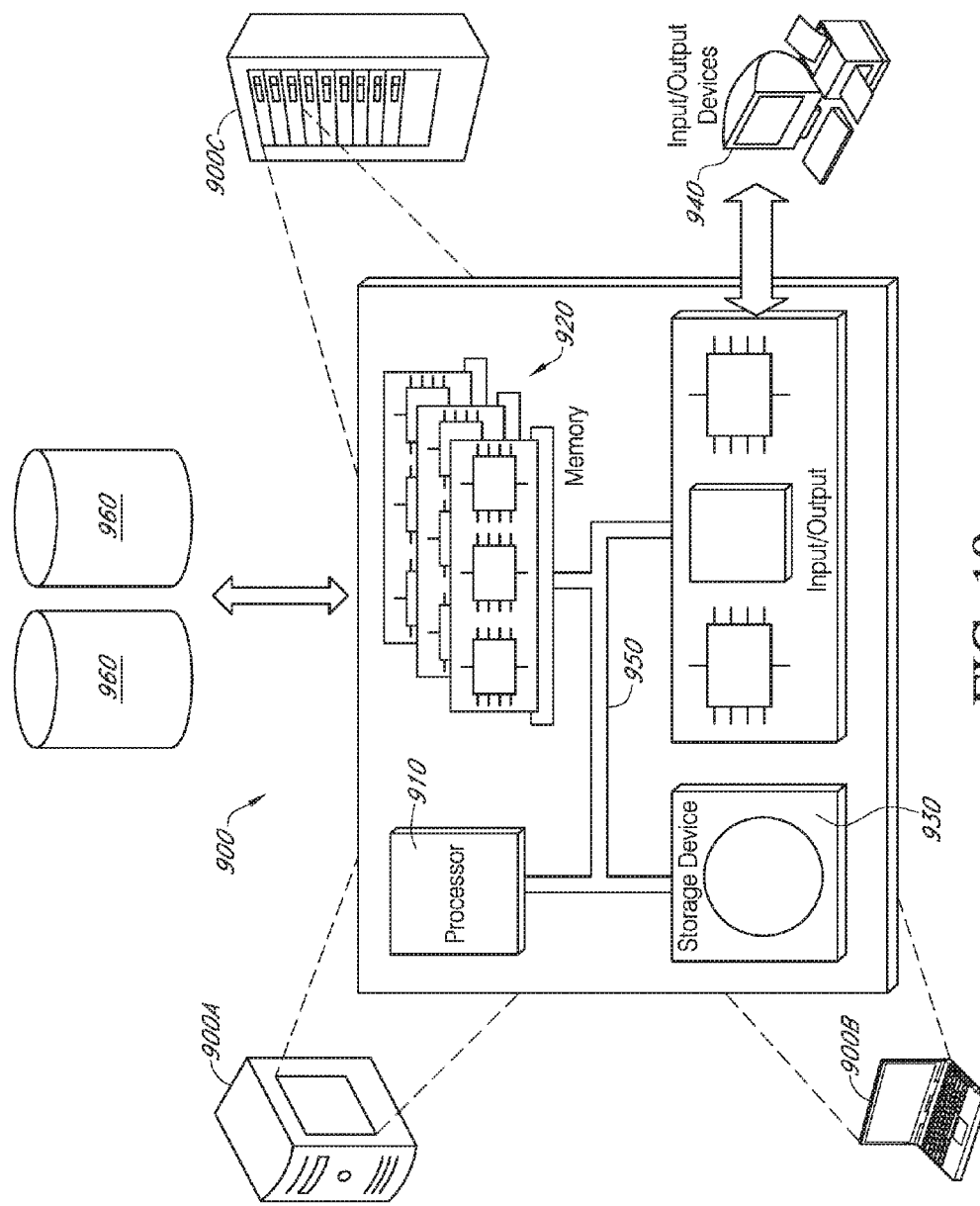
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of the present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The 110 devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s).

What is claimed is:

1. A method for transmitting and storing video images captured by an audio/video (A/V) recording and communication device, the A/V recording and communication device including a camera and a local storage device, the A/V recording and communication device being connected to a network, the method comprising:

the A/V recording and communication device detecting a person at the A/V recording and communication device;

the camera of the A/V recording and communication device capturing video images from within a field of view of the camera at the A/V recording and communication device;

initiating a call to a client device via the network;

transmitting the video images in a plurality of data packets to the client device via the network;

receiving at least one negative-acknowledgement (NACK) indicating that at least one of the data packets was lost in transmission;

retransmitting the lost data packets to the network;

receiving a message with a list of data packets that were lost in retransmission;

storing copies of the data packets on the list at the local storage device of the A/V recording and communication device;

receiving a notification that the call with the client device has terminated; and after receiving the notification that the call with the client device has terminated, retrieving the data packets stored at the local storage device of the A/V recording and communication device and retransmitting the retrieved data packets to the network.

2. The method of claim 1, wherein the retrieved data packets are retransmitted to the network using a reliable data transfer protocol.

3. The method of claim 1, wherein the A/V recording and communication device further comprises a sensor, and wherein detecting the person at the A/V recording and communication device comprises the sensor detecting the person.

4. The method of claim 3, wherein the sensor is a motion sensor.

5. The method of claim 1, wherein the A/V recording and communication device is a doorbell having a button.

6. The method of claim 5, wherein detecting the person at the A/V recording and communication device comprises detecting that the button has been depressed.

7. The method of claim 1, wherein the A/V recording and communication device further comprises a microphone and a speaker.

8. An audio/video (A/V) recording and communication device, the A/V recording and communication device comprising:

a camera, a processor, a memory, and a local storage device, the A/V recording and communication device being connected to a network, wherein the memory stores code operable by the processor for detecting a person at the A/V recording and communication device;

capturing video images from within a field of view of the camera at the A/V recording and communication device;

initiating a call to a client device via the network;

transmitting the video images in a plurality of data packets to the client device via the network;

receiving at least one negative-acknowledgement (NACK) indicating that at least one of the data packets was lost in transmission;

retransmitting the lost data packets to the network;

receiving a message with a list of data packets that were lost in retransmission;

storing copies of the data packets on the list at the local storage device of the A/V recording and communication device;

receiving a notification that the call with the client device has terminated; and after receiving the notification that the call with the client device has terminated, retrieving the data packets stored at the local storage device of the A/V recording and communication device and retransmitting the retrieved data packets to the network.

9. The A/V recording and communication device of claim 8, wherein the retrieved data packets are retransmitted to the network using a reliable data transfer protocol.

10. The A/V recording and communication device of claim 8, wherein the A/V recording and communication device further comprises a sensor, and wherein detecting the person at the A/V recording and communication device comprises the sensor detecting the person.

11. The A/V recording and communication device of claim 10, wherein the sensor is a motion sensor.

12. The A/V recording and communication device of claim 8, wherein the A/V recording and communication device is a doorbell having a button.

13. The A/V recording and communication device of claim 12, wherein detecting the person at the A/V recording and communication device comprises detecting that the button has been depressed.

14. The A/V recording and communication device of claim 8, wherein the A/V recording and communication device further comprises a microphone and a speaker.

* * * * *